United States Patent [19]

Bezman et al.

[11] Patent Number: 5,277,793
[45] Date of Patent: Jan. 11, 1994

[54] HYDROCRACKING PROCESS

[75] Inventors: Richard D. Bezman, Point Richmond; Dennis R. Cash, Novato, both of Calif.

[73] Assignee: Chevron Research and Technology Company, San Francisco, Calif.

[21] Appl. No.: 835,109

[22] Filed: Feb. 13, 1992

Related U.S. Application Data

[60] Continuation of Ser. No. 719,471, Jun. 24, 1991, abandoned, which is a division of Ser. No. 349,758, May 10, 1989, Pat. No. 5,073,530.

[51] Int. Cl.$^5$ .................. C10G 47/02; C10G 47/12
[52] U.S. Cl. .................... 208/111; 208/108; 208/109; 208/110
[58] Field of Search ............................. 208/110, 111

[56] References Cited

U.S. PATENT DOCUMENTS

| 4,456,527 | 6/1984 | Buss et al. | 208/89 |
| 4,500,645 | 2/1985 | Fuchikami | 502/61 |
| 4,784,747 | 11/1988 | Shihabi | 208/111 |

Primary Examiner—Helane Myers
Attorney, Agent, or Firm—V. J. Cavalieri

[57] ABSTRACT

This invention provides an improved hydrocracking catalyst which includes an inorganic oxide component, such as alumina, a hydrogenation component, such as a base metal or a noble metal and a zeolite component which is a Y-zeolite. The catalyst in this invention is particularly characterized in that the zeolite component of the catalyst has a number average crystal size of less than about 0.5 micron, preferably less than about 0.4 micron. In the process aspect of this invention the use of the above catalyst in hydrocracking processes provides improved liquid fraction yields, particularly yields of high octane gasoline, diesel fuel and premium quality jet fuel. The catalyst also produces a corresponding decrease in production of light gasses, while providing no significant increase in coking or decrease in catalyst life. In another aspect this invention provides a Y-type zeolite having an average crystal size of less than about 0.5 micron which comprises less than about 0.5 wt. % alkaline metal oxide and which contains an effective amount of oxometallic cations positioned in the beta-cages of the zeolite to substantially stabilize the zeolite against the thermal degradation.

4 Claims, 1 Drawing Sheet

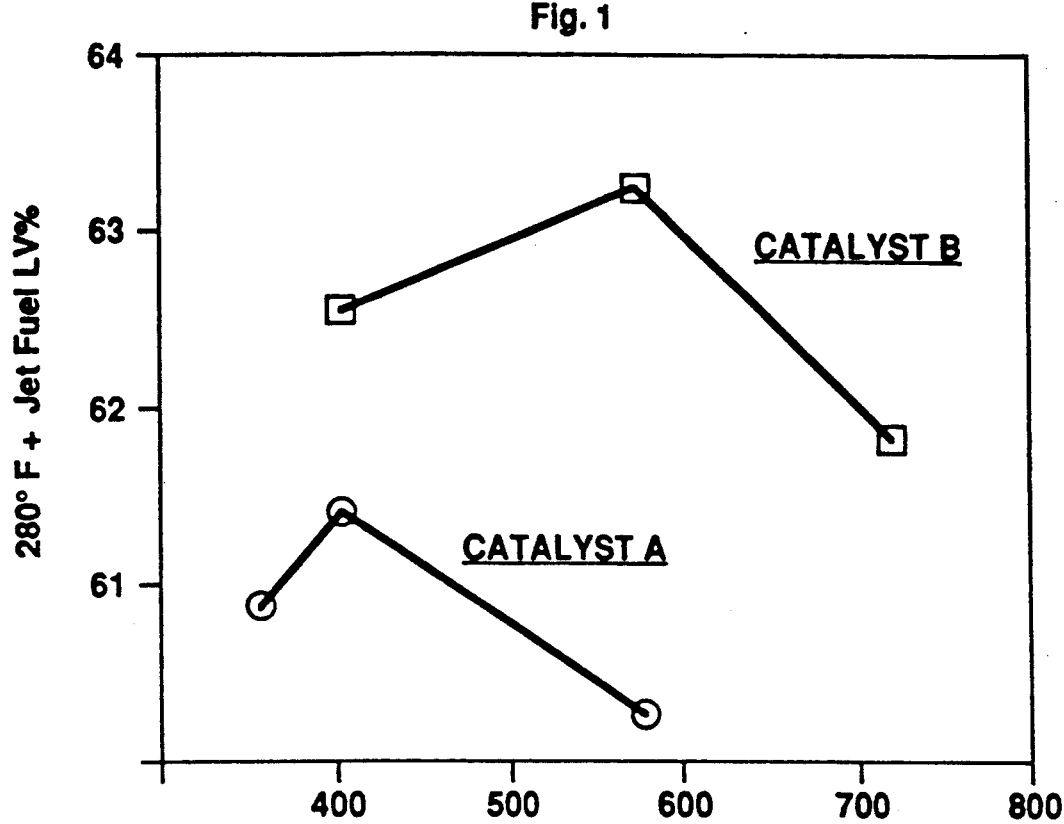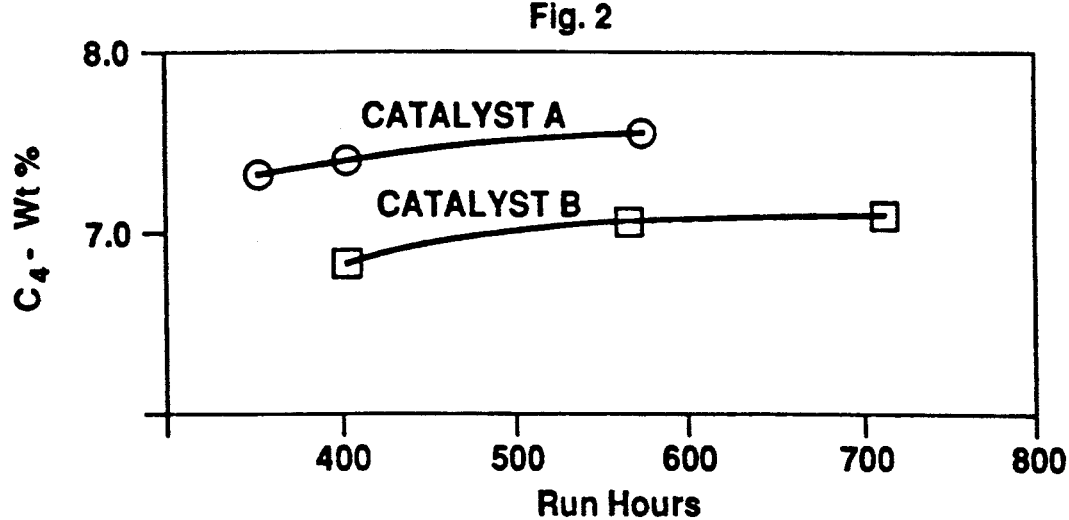

HYDROCRACKING PROCESS

This application is a continuation of application Ser. No. 07/719,471, filed Jun. 24, 1991, now abandoned which is a divisional, of application Ser. No. 07/349,758, filed May 10, 1989 now U.S. Pat. No. 5,073,530.

FIELD OF THE INVENTION

This invention relates to novel zeolite-containing hydrocracking catalysts and improved hydrocracking processes resulting from the use of the novel catalyst.

BACKGROUND OF THE INVENTION

Zeolite-containing catalysts are commonly used in the petroleum refining industry. A significant area of application is in hydrocracking processes which convert certain low grade distillates and oils to valuable transportation fuels, particularly, high octane gasoline, diesel fuel and premium quality jet fuel.

A particular class of zeolite catalysts which are of special interest in hydrocracking processes are those which use Y-type zeolites in combination with an inorganic oxide component which serves as a binder for the zeolite component. The zeolite/inorganic oxide catalyst is prepared by various processes into particles or pellets which are suitable for use in a fixed bed hydrocracking process.

Examples of such zeolite-containing catalysts, their preparation and their use in hydrocracking processes are disclosed in U.S. Pat. Nos. 4,401,556 to Bezman, et al.; 3,449,070 to McDaniel, et al.; 4,252,688 to Gallei, et al.; 4,419,271 to Ward; 4,429,053; to Ward, 4,456,693 to Welsh; and 4,556,646 to Bezman, the disclosures of which patents are incorporated herein by reference.

Hydrocracking is a very versatile process and is critically important to the economics and operation of petroleum refining. In the continually changing refining business environment, hydrocracking processes and consequently the catalysts used therein must also change to meet technical and economic requirements. The changing requirements placed on the hydrocracking processes result from declining feed stock quality, changing product demand patterns, increasingly stringent product quality requirements imposed by industry and government regulations as well as the ever present desire to increase unit throughput with minimum capital investment. Therefore, it is an object of this invention to maintain efficient conversion of low grade distillates and gas oils while increasing the selectivity for production of liquid products and decreasing the yield of light gases. It is a further object of this invention to accomplish the increased liquid selectivity without any decrease in catalyst activity or increase in coke formation.

SUMMARY OF THE INVENTION

In a first aspect, this invention is an improved hydrocracking catalyst having a particle size suitable for use in a fixed bed hydrocracking process comprising an inorganic oxide component, a zeolite component and a hydrogenation component, wherein the zeolite component is a Y-zeolite comprising at least about 1 percent by weight of the catalyst and has a number average crystal size of less than about 0.5 micron. Preferably, the inorganic oxide is alumina; and the hydrogenation component is palladium. Other hydrogenation components comprising noble or base metals may be added to the zeolite component, the inorganic oxide component or both.

In another aspect this invention is a Y-type zeolite having an average crystal size less than about 0.5 micron comprising (a) less than about 0.5 wt % alkali metal oxide and (b) an effective amount of oxometallic cations positioned in the beta-cages of the zeolite to effectively stabilize the zeolite against thermal degradation.

In another aspect this invention is an improved hydrocracking process utilizing the above hydrocracking catalyst.

BRIEF DESCRIPTION OF THE DRAWING

The FIGURE shows the relative increase in the jet fuel liquid volume fraction produced by the catalyst of this invention and the corresponding decrease in the light gas production in the hydrocracking process utilizing the catalyst of this invention.

DESCRIPTION OF THE INVENTION

The catalyst of this invention comprises an inorganic oxide component, a zeolite component and a hydrogenation component wherein the inorganic oxide component is preferably an alumina, the zeolite component is preferably a Y-zeolite and the hydrogenation component is preferably a noble metal, such as palladium. As explained below each of these components can be varied widely within the skill of the hydrocracking catalyst art without departing from the spirit or scope of the present invention. The important aspect of the catalyst of this invention is that the zeolite component comprises crystals having a number average crystal size of less than about 0.5 micron, preferably less than about 0.4 micron and more preferably less than about 0.3 micron. A preferred catalyst is that wherein the zeolite component comprises crystals of a Y-zeolite having a number average crystal size of about 0.2 micron or less. The amount of the Y-zeolite crystals in the catalyst composition can be as low as least about 1 percent by weight based on the total weight of the catalyst, should be at least about 10 percent by weight preferably at least about 40 percent by weight and more preferably at least about 60 percent by weight. Actual zeolite concentrations will, of course be adjusted to meet catalytic performance requirements. When the hydrogenation component is a base metal and the catalyst is used as a first stage hydrocracking catalyst, the amount of zeolite having crystal size less than about 0.5 micron can be a little as 1 percent by weight and have a significant affect on liquid product and light gases production. When the hydrogenation component is a nobel metal and the catalyst is used as a second stage hydrocracking catalyst, it may be desirable to use at least about 3 percent by weight of zeolite having crystal size less than about 0.5 micron in order to produce a desired significant increase in liquid volume production.

The zeolite component will generally be a Y-type zeolite having a crystal size less than about 0.5 micron, especially a stabilized Y-type zeolite. A particularly preferred zeolite starting materials for preparing the catalyst of this invention is the hydrated Na-Y-type zeolite, such as the VALFOR (trademark) CP300-66, available from the PQ Corporation, Valley Forge, Pa., which has a number average crystal size of 0.2 micron, a unit cell size of about 24.66 Å, a $SiO_2/Al_2O_3$ mole ratio greater than about 4.5, a surface area greater than 800 m$^2$/g, and a sodium content of about 10 wt %.

In the catalyst of this invention, it is especially desirable for the zeolite component to have a low alkali metal content, i.e., a high acidity. The low alkali metal results in the zeolite having high activity, which means that high levels of feed conversion can be maintained at relatively low operating temperatures in the hydrocracking process. It is also especially desirable for the zeolite component to be thermally stable, i.e., be able to retain its crystalline structure at the high temperatures encountered during process upsets of during oxidative regeneration of the catalyst. Y-type zeolites that meet both the above requirements can be prepared by subjecting a Na-Y-zeolite to a first step of filling the beta-cages with highly charged oxometallic cations then to a second step of removing the alkali metal cations, including those displaced from the beta-cages, by ion exchange with solutions of ammonium salts, such as ammonium nitrate. In this way, the resulting zeolite contains little sodium, typically less than 0.5 wt % $Na_2O$, and therefore has very high activity in hydrocarbon conversion processes. The zeolite also has excellent thermal stability due to the oxometallic cations which are present; it is believed that these oxometallic cations essentially prop the structure open, preventing collapse at high temperatures. Other methods of preparing active, thermally stable zeolites for use in this invention will be apparent to one skilled in the art. The oxometallic cations can comprise aluminum or other appropriate metal and/or can comprise a rare earth, such as lanthanum, cerium, neodymium or praseodymium.

The crystal size of the zeolite used to prepare and characterize the catalysts of this invention is most reliably determined by procedures in which the zeolite is first dispersed to reduce the size of polycrystalline agglomerates. High resolution electron micrographs of the dispersed material can then be prepared, after which the average size of individual zeolite crystals can be determined by reference to calibrated length standards. An average crystal size may then be computed in various well-known ways, two of which are:

$$\text{Number average} = \frac{\sum_{i=1}^{n} n_i L_i}{\sum_{i=1}^{n} n_i}$$

$$\text{Volume average} = \left[ \frac{\sum_{i=1}^{n} n_i L_i^3}{\sum_{i=1}^{n} n_i} \right]^{\frac{1}{3}}$$

where $n_i$ is the number of zeolite crystals where minimum length falls within an internal $L_i$. For purposes of this disclosure, average crystals size will be defined as a number average. It is important to note that for purposes of this invention zeolite crystal size is distinguished from what some manufacturers term "zeolite particle size", the latter being the average size of all particles, including both individual crystals and polycrystalline agglomerates, in the as-produced zeolite powder.

The ratio by weight of the inorganic oxide component to the zeolite component is can be between 1:4 and 99:1, but generally is between 1:4 and 4:1 and preferably will be between 1:2 and 2:1.

The inorganic oxide component of the catalyst base will generally be alumina, silica, magnesia, zirconia, beryllia, titania, or a mixture of two or more of these. Preferred are alumina, silica and mixtures thereof, including amorphous aluminosilicates.

The hydrogenation component of the catalyst can comprise a noble metal or a base metal and can be impregnated into the inorganic oxide, the zeolite or both. In this application, the term "noble metal" includes one or more of ruthenium, rhodium, palladium, osmium, iridium or platinum. The term "base metal" includes one or more of nickel, cobalt, tungsten or molybdenum. Usually, a combination of base metals are used, such as nickel or cobalt in combination with tungsten or molybdenum, and the base metal is usually sulfided or presulfided in the catalyst when or before the catalyst is put on stream. The term "impregnation" shall means the addition to a solid of a volume of solution not substantially greater than that which can be absorbed by the solid, and allowing the solution to be absorbed by or in the solid, followed, without an intermediate washing step, by the drying of the solution onto the solid.

EXAMPLES

The catalysts used in the following examples were made from palladium loaded, rare earth stabilized Y-type zeolites which were physically and chemically identical, except for the crystal size of the zeolite-component. In one catalyst, the zeolite crystals had a number average size of 1 micron while in the other, the number average size was 0.2 micron. Of course, the 0.2 micron crystal size zeolite had an external surface area estimated to be 5 times the external surface area of the 1 micron crystal size zeolite.

The hydrocracking characteristics of the catalysts were determined using pilot plant equipment in which extinction recycle operation is maintained, and with which accurate, mass-balanced product yields can be determined. The feedstock was a hydrofined heavy vacuum gas oil.

The tests revealed no significant effects of crystal size on hydrocracking activity, product qualities, or coke selectivity. However, economically significant differences in yield structures were apparent. The small crystal zeolite catalyst produced a larger yield of jet fuel and correspondingly lower yields of naphtha and light gases.

The starting materials for the catalyst preparations were the commercially-produced Na-Y zeolites whose properties are summarized in Table I. The only significant difference between the two zeolites is the large difference in crystal size. The following described procedures were used to prepare from the two Na-Y zeolites alumina-bonded, calcined rare earth Y-zeolite (CREY) catalysts, having a high rare earth content and referred to herein as the 0.25% Pd/60% $NH_4$-CREY catalysts.

1. The zeolites were exhaustively ion exchanged with diluted solutions of Molycorp type 5240 rare earth chloride. They were then washed chloride-free and dried.
2. The rare earth-containing zeolites were calcined in bone dry air for two hours at 1050° F.
3. The products were ion exchanged twice with solutions of ammonium chloride, after which they were washed chloride-free and dried. At this point, the sodium content of the zeolites had been reduced to less than 0.5 wt. %.

4. The ammonium-exchanged materials, NH4-CREY's, were loaded to 0.42 wt % palladium by an ion exchange process, after which the products were washed with deionized water and dried.
5. The palladium-containing zeolites were mixed with acid-peptized boehmite alumina to produce composites containing 60 wt % zeolite. The pastes were extruded to produce 0.1-inch diameter cylindrical particles, which were subsequently dried and calcined to produce finished catalyst having a nominal particle size of 0.1 inch diameter by 0.4 inch length cylinders. The catalysts contained 0.25 wt % palladium and 60 wt % zeolite.

The catalysts were tested using the heavy feedstock and the process conditions described in Table II.

The properties of the finished, Pd-containing catalysts are summarized in Table III. In all respects, the bulk properties of the two catalysts (including the thermal stabilities of the zeolite components) are essentially identical.

Activity and yield data from tests of the two catalysts are summarized in Table IV. In general, the catalysts were equally active which indicates that crystal size does not affect intrinsic surface activity. Of great importance, through, is that while liquid yields varied during each run (they peaked at about 400 hours), at comparable times on feed, the small crystal catalyst yielded less gas and more liquid, especially jet fuel, than its large crystal counterpart.

Coke selectivities for a series of three tests of Pd/NH4-CREY catalysts are summarized in Table V, and show that zeolite crystal size does not affect this characteristic. In practical terms, this means that catalyst life will probably not be a function of zeolite crystal size, and that the yield benefits associated with use of the catalysts of this invention may be obtained without loss of service life.

TABLE I

| Na—Y Zeolite Starting Materials | | |
| --- | --- | --- |
| | A | B |
| Chemical Composition | | |
| $Na_2O/Al_2O_3$, mole/mole | 1.00 | 1.08 |
| $SiO_2/Al_2O_3$ | 4.92 | 4.92 |
| Physical Properties | | |
| a., Å | 24.69 | 24.67 |
| 5-pt SA, $m^2/g$* | 740 | 766 |
| Crystal size (SEM), micron | 1 | 0.2 |

*Outgassed at 150° C.
Zeolite A was Linde LZ-Y52 from Union Carbide Corporation.
Zeolite B was VALFOR CP 300-66 from the PQ Corporation

TABLE II

| Feedstock and Process Conditions Tests of Pd—NH4—CREY Catalysts | |
| --- | --- |
| Feedstock | |
| Gravity °API | 32.0 |
| S/N ppmwt | 2.5/0.2 |
| P/N/A, LV % | 17/67/16 |
| ASTM D-1160, °F. | |
| ST/5 | 528/592 |
| 10/30 | 622/682 |
| 50 | 727 |
| 70/90 | 765/817 |
| 95/EP | 842/896 |
| Process Conditions | |
| Pressure, PSIG | 1200 |
| LHSV, $Hr^{-1}$ | 0.60 |
| Gas recycle, SCF/Bbl | 6500 |
| Per pass conversion, LV % | 70 |
| Recycle cut point, °F. | 500 |

TABLE III

| Properties of 0.25% Pd/60% NH4—CREY Catalysts | | |
| --- | --- | --- |
| NH4—CREY base | Zeolite A | Zeolite B |
| Na, wt % (anhyd) | 0.4 | 0.4 |
| Rare earth oxides, wt. % | 16.0 | 15.6 |
| Micropore SA, $m^2/g$ | 650 | 653 |
| Crystal collapse in dry air, °C. | 1007 | 1000 |
| Finished Catalyst: | Catalyst A | Catalyst B |
| Loaded density, g/ml | 0.65 | 0.65 |
| SA, $m^2/g$ | 511 | 515 |
| Pd dispersion, % | 33 | 36 |

TABLE IV 0.25% Pd/60% NH4—CREY Catalysts
Catalyst A: 1 micron zeolite component
Catalyst B: 0.2 micron zeolite component

| | Catalyst A | | | | | |
| --- | --- | --- | --- | --- | --- | --- |
| Example No. | 1 | | 2 | | 3 | |
| Run Hours | 344–368 | | 392–416 | | 560–584 | |
| Reactor Temp. °F. | 580 | | 579 | | 577 | |
| Overall LHSV | 0.60 | | 0.61 | | 0.60 | |
| Per Pass Conversion | 70.77 | | 69.73 | | 70.33 | |
| Total Pressure, PSIG | 1205 | | 1201 | | 1199 | |
| Recycle Gas, SCF/B | 6507 | | 6341 | | 6457 | |
| No-loss product yields | wt. % | vol. % | wt. % | vol. % | wt. % | vol. % |
| C1 | 0.01 | | 0.01 | | 0.01 | |
| C2 | 0.02 | | 0.02 | | 0.01 | |
| C3 | 0.91 | | 0.92 | | 0.90 | |
| IC4 | 5.15 | 7.92 | 5.23 | 8.04 | 5.33 | 8.19 |
| NC4 | 1.24 | 1.83 | 1.27 | 1.88 | 1.27 | 1.87 |
| C5-180° F. | 13.21 | 17.45 | 13.16 | 17.41 | 13.66 | 18.07 |
| 18C-280° F. | 26.15 | 30.78 | 25.67 | 30.22 | 26.08 | 30.66 |
| 280-RCP | 55.09 | 60.92 | 55.47 | 61.41 | 54.51 | 60.31 |
| Recycle cut point, °F. | | 498 | | 496 | | 498 |
| Total C5+ | 94.45 | 109.14 | 94.30 | 109.05 | 94.25 | 109.05 |
| Act/no loss recov, wt % | 101.70 | // | 101.78 | 101.83 | // | 101.74 | 101.72 | // | 101.77 |
| H2 Cons (Gross), SCF/B | 1070 | | 1044 | | 1064 | |
| H2 Cons (Chem), SCF/B | 1014 | | 993 | | 1011 | |

TABLE IV-continued 0.25% Pd/60% NH4—CREY Catalysts
Catalyst A: 1 micron zeolite component
Catalyst B: 0.2 micron zeolite component

| | Catalyst B | | | | | |
|---|---|---|---|---|---|---|
| Example No. | 4 | | 5 | | 6 | |
| Run Hours | 388–412 | | 556–580 | | 700–724 | |
| Reactor Temp. °F. | 583 | | 579 | | 578 | |
| Overall LHSV | 0.58 | | 0.60 | | 0.60 | |
| Per Pass Conversion | 73.95 | | 70.13 | | 69.81 | |
| Total Pressure, PSIG | 1207 | | 1197 | | 1198 | |
| Recycle Gas, SCF/B | 6719 | | 6403 | | 6415 | |
| No-loss product yields | wt. % | vol. % | wt. % | vol. % | wt. % | vol. % |
| C1 | 0.01 | | 0.01 | | 0.01 | |
| C2 | 0.02 | | 0.02 | | 0.02 | |
| C3 | 0.87 | | 0.89 | | 0.90 | |
| IC4 | 4.74 | 7.28 | 4.90 | 7.54 | 4.98 | 7.65 |
| NC4 | 1.19 | 1.76 | 1.22 | 1.80 | 1.21 | 1.80 |
| C5-180° F. | 12.55 | 16.59 | 11.81 | 15.51 | 12.80 | 16.85 |
| 18C-280° F. | 25.69 | 30.22 | 25.77 | 30.36 | 26.01 | 30.62 |
| 280-RCP | 56.65 | 62.61 | 57.14 | 63.33 | 55.84 | 61.88 |
| Recycle cut point, °F. | | 495 | | 496 | | 493 |
| Total C5+ | 94.90 | 109.42 | 94.72 | 109.20 | 94.65 | 109.36 |
| Act/no loss recov, wt % | 100.92 | // | 100.93 | // | 101.02 | // |
| | | 101.73 | | 101.76 | | 101.77 |
| H2 Cons (Gross), SCF/B | | 1042 | | 1062 | | 1069 |
| H2 Cons (Chem), SCF/B | | 985 | | 1003 | | 1010 |

Selected data from the above Table IV are graphically shown on the drawing herein, where it can be seen that the increase in liquid fraction yield and the decrease in light gas production is significant, particularly from the economic standpoint.

TABLE V

Coke Yields: 0.25% Pd/60% NH4 CREY Catalyst

| Catalyst | A | A' | B |
|---|---|---|---|
| Hours of feed | 828 | 842 | 670 |
| Coke yield g/Kg FF | 0.10 | 0.1 | 0.11 |

Note:
Catalyst A' was the same as Catalyst A except it was prepared to have low rare earth content, i.e., about 8.5% compared to about 16% by weight for Catalysts A and B.

We claim:

1. A hydrocracking process comprising contacting a hydrocarbon with hydrogen in the presence of a catalyst comprising an inorganic oxide component, a Y zeolite component and a hydrogenation component wherein the zeolite component has a number average crystal size of less than about 0.5 micron, and a thermally stabilizing amount of oxometallic cations positioned in the beta-cages of said Y zeolite.

2. A process according to claim 1 wherein the number average crystal size of the zeolite component is less than about 0.4 micron.

3. A process according to claim 1 wherein the hydrogenation component is a metal comprising palladium.

4. A process according to claim 1 wherein the hydrogenation component is a metal comprising a base metal.

* * * * *